March 9, 1943. W. L. BROWN 2,313,515
GAS METER
Filed Nov. 1, 1938 4 Sheets-Sheet 1
FIG. I.
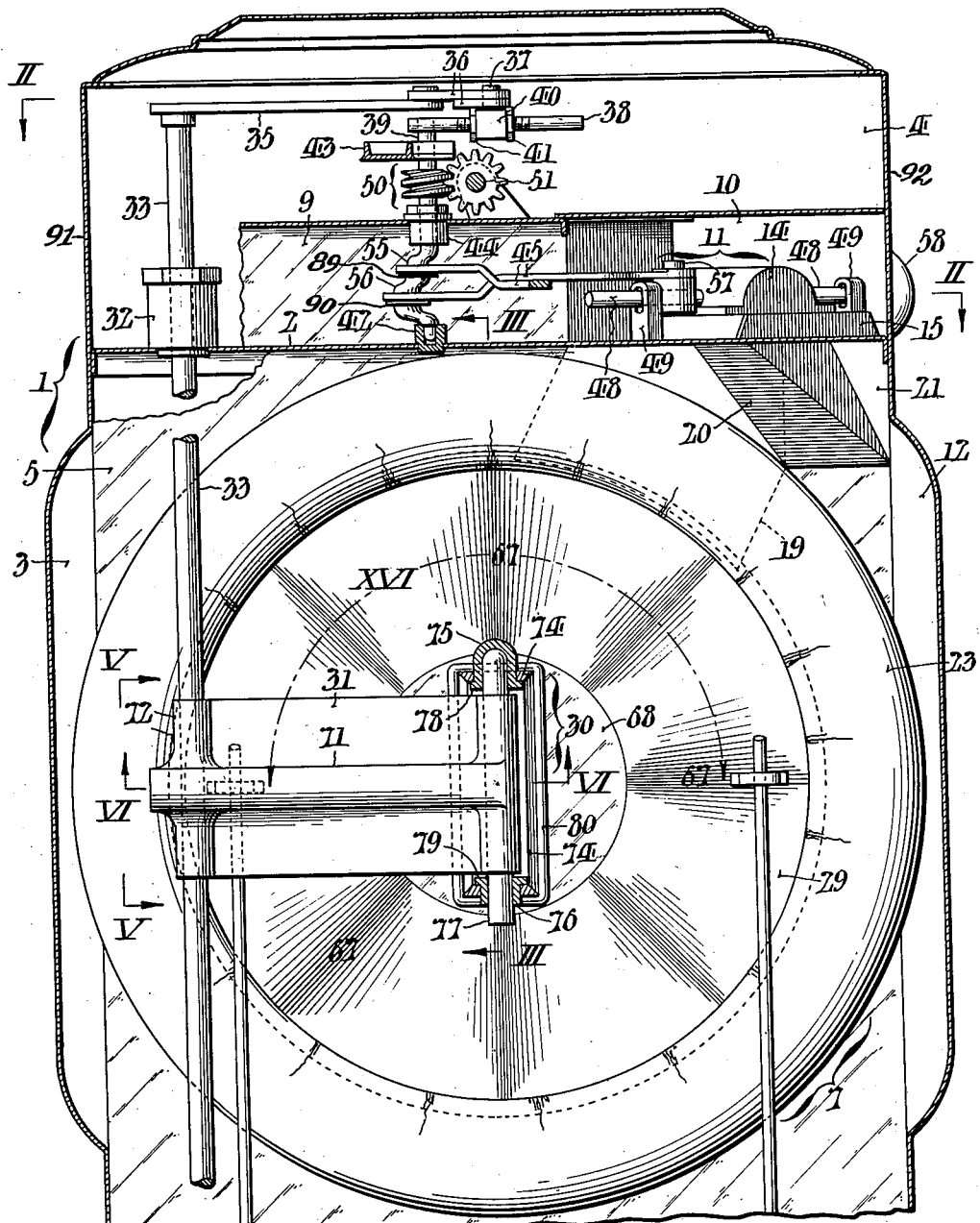
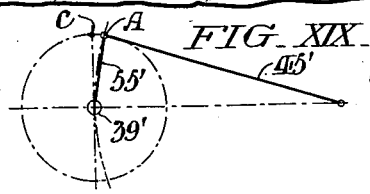
FIG. XIX.
INVENTOR:
William Laird Brown

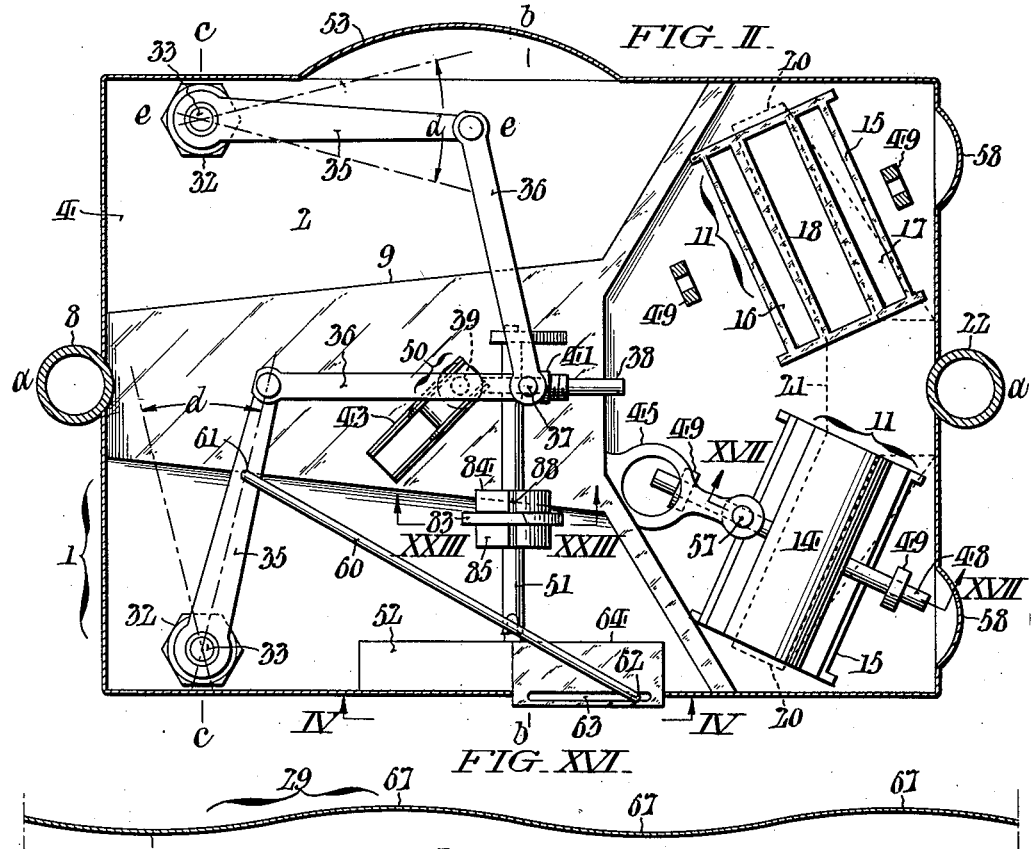

March 9, 1943. W. L. BROWN 2,313,515
GAS METER
Filed Nov. 1, 1938 4 Sheets-Sheet 3
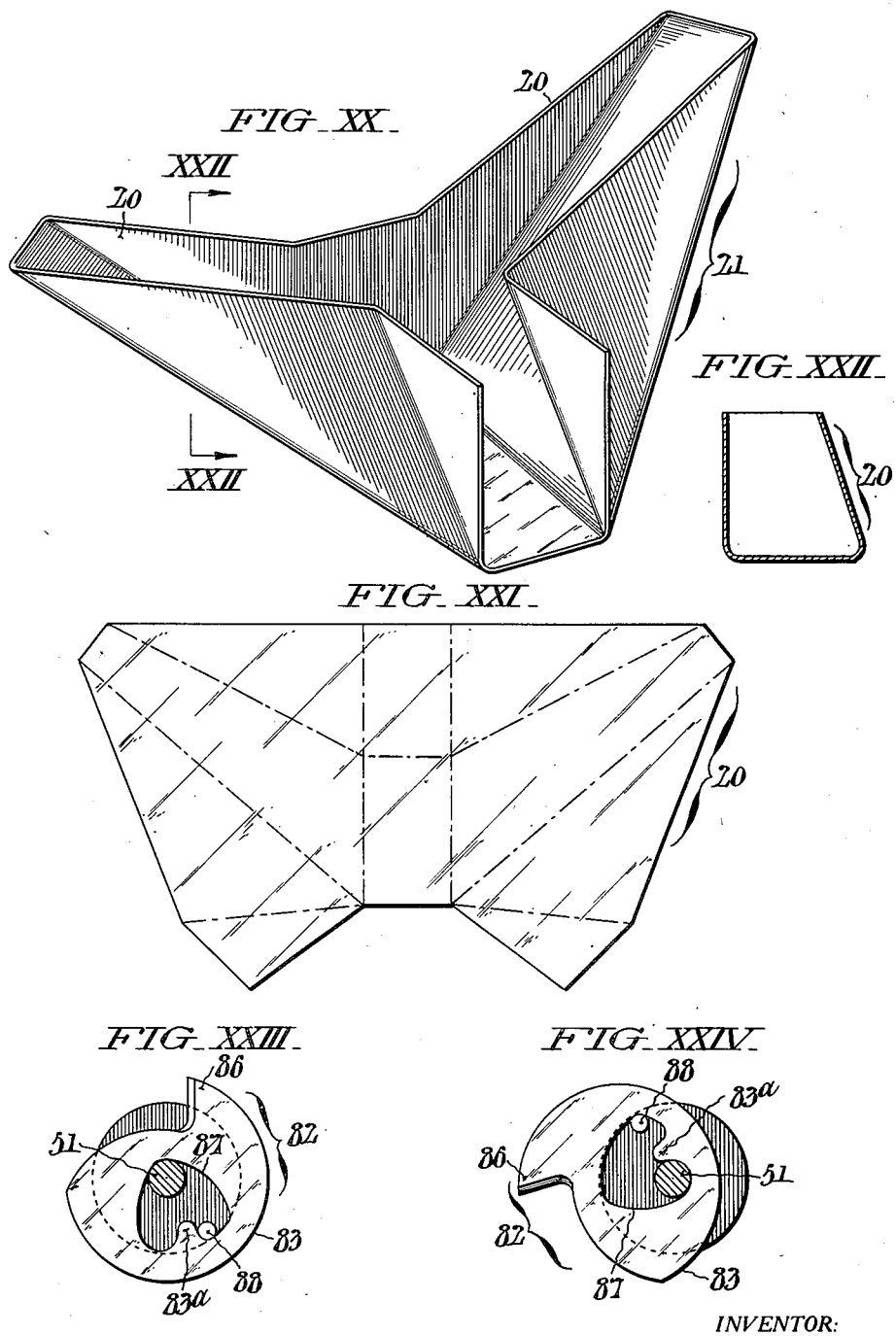
INVENTOR:
William Laird Brown

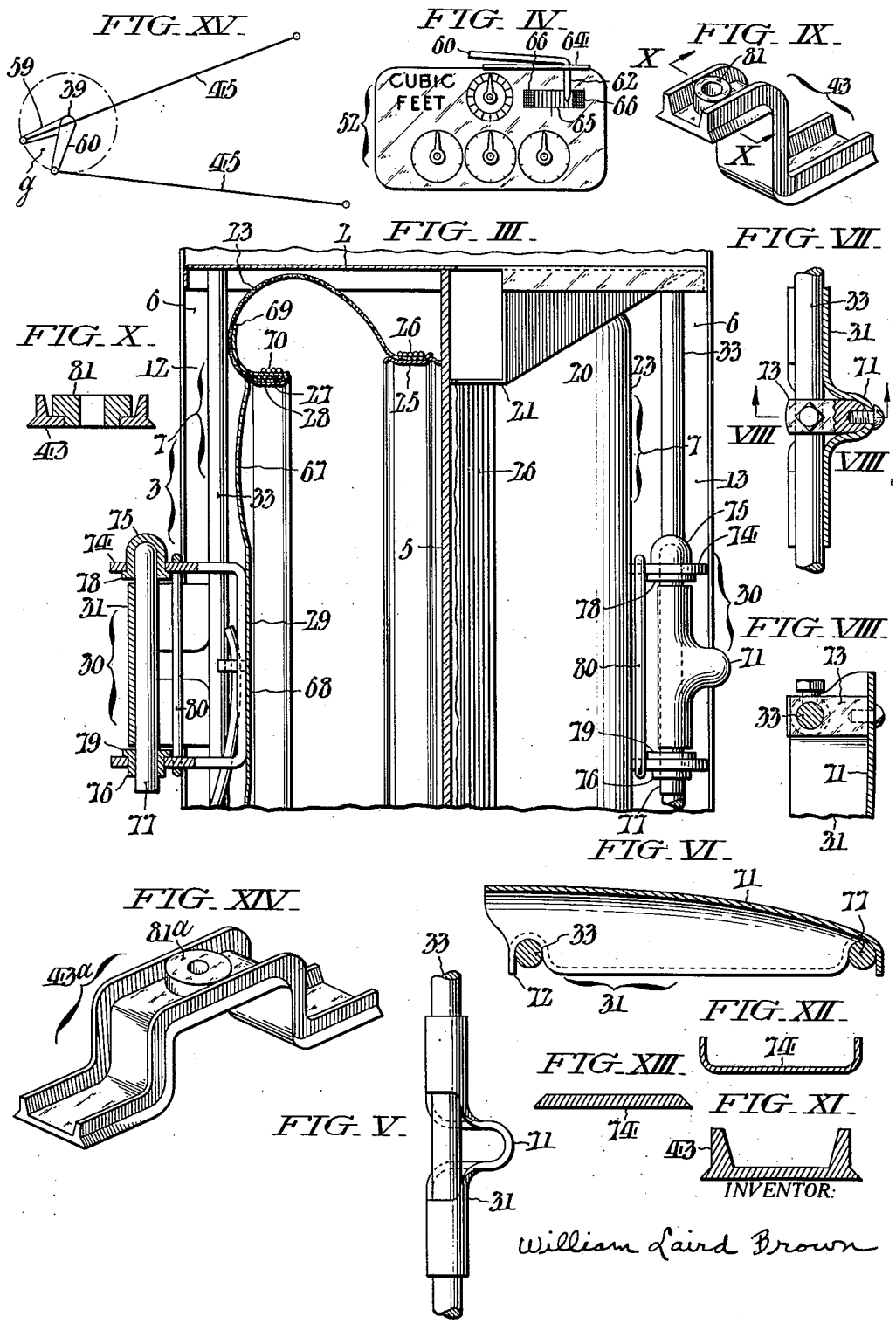

Patented Mar. 9, 1943

2,313,515

UNITED STATES PATENT OFFICE 2,313,515

GAS METER

William Laird Brown, Lansdowne, Pa.

Application November 1, 1938, Serial No. 238,133

27 Claims. (Cl. 73—268)

This invention relates to gas meters; and it has reference more particularly to tinned steel case meters of the positive displacement type designed to measure the flow of gases volumetrically. In meters of the type referred to, the gas alternately traverses a pair of opposing bellows, which, through flags and flag rods, actuate a linkage mechanism whereby a tangent arm is rotated, said tangent arm being secured to a crank shaft from which reciprocating slide valves in a valve box are actuated to control admission and exhaust of the gas to and from the bellows.

My invention has for one of its aims to obtain a larger diaphragm stroke in positive displacement meters of a given size without increasing the angularity between the tangent links and the tangent circle, thus increasing meter capacity without increasing speed or irregularity of operation. This desideratum I realize in practice, as hereinafter more fully disclosed, through improved proportioning and arrangement of the arms and links constituting the mechanism by which motion is transmitted from the bellows to the valves.

Further aims of my invention are to compensate for the angularity of the valve crank, and to predetermine more gradual admission and exhaust of the gas, which objectives I also attain as hereinafter more fully disclosed through modification of the valve ports and the valve covers.

Through provision of an improved fork channel for conducting the gas from the valves to the meter outlet, I further aim to make possible closer vertical spacing of the diaphragms, and less resistance to the flow of gas.

I further aim to provide an improved flag which lends itself to economic fabrication as an embossed structure, from relatively thin sheet metal, and which, although light in weight, is highly resistive to distortion or bending.

Another object is to provide a flag carriage of improved construction which is immune to damage by heat incident to being soldered to the diaphragm disk originally, or to being unsoldered when repairs are made to the meter.

Other objects and attendant advantages will appear from the following detailed description of the attached drawings, wherein Fig. I is a vertical section of a gas meter conveniently embodying the present improvements, viewed from the front with portions broken out to expose important parts which would otherwise be hidden.

Fig. II is a staggered horizontal sectional view of the meter taken as indicated by the arrows II—II in Fig. I.

Fig. III is a fragmentary view, partly in section as indicated by the arrows III—III in Fig. I, and partly in section taken on a plane to the front of line III—III.

Fig. IV is a detail view looking as indicated by the arrows IV—IV in Fig. II, and showing the index of the meter with my improved leak indicator.

Fig. V is a view looking as indicated by the arrows V—V in Fig. I showing one of the flags in end elevation.

Fig. VI is a longitudinal section of the flag taken as indicated by the arrows VI—VI in Fig. I.

Fig. VII is a fragmentary view in section corresponding to Fig. V and showing a means for strengthening the connection of the flag to the flag rod.

Fig. VIII is a detail section taken as indicated by the arrows VIII—VIII in Fig. VII.

Fig. IX is a perspective view of the upper bearing member or kingpost for the crank shaft of my improved meter.

Fig. X is a section taken as indicated by the arrows X—X in Fig. IX through the bearing of the kingpost.

Figs. XI, XII, and XIII show metal of different cross sections from which either the kingpost or the flag carriage may be fashioned in accordance with my invention.

Fig. XIV is a perspective view of an alternative form of crank shaft bearing member.

Fig. XV is a diagram in plan showing the relation of the crank shaft, the crank arms, and the slide valves of my improved meter.

Fig. XVI shows a development of one of the diaphragm disks of the meter along the dash and dot line circle designated XVI in Fig. I.

Figs. XVII and XVIII are juxtaposed sectional views in diagrammatic form respectively of a valve of ordinary construction, and a valve constructed according to my invention.

Fig. XIX is a diagram showing the principle upon which the actuation of the valves is based.

Fig. XX is a perspective view of my improved fork channel through which gas is exhausted to the outlet of the meter.

Fig. XXI shows the sheet metal blank from which the fork channel is formed.

Fig. XXII is a transverse sectional view of one of the branches of the fork channel taken as indicated by the arrows XXII—XXII in Fig. XX.

Fig. XXIII is a detail sectional view taken as indicated by the arrows XXIII—XXIII in Fig. II and showing the improved reverse stop of the meter in its normal position.

Figs. XXIV and XXV are views corresponding to Fig. XXIII showing successive positions assumed by the reverse stop in changing from its normal inactive condition to operative condition incident to initiation of reversed operation of the meter.

Fig. XXVI is a section of the reverse stop taken as indicated by the arrows XXVI—XXVI in Fig. XXV.

Fig. XXVII is a perspective view of the reverse stop.

The gas meter herein delineated for convenience of exemplifying my invention is generally of well known construction, having a rectangular casing 1 of sheet metal with substantially vertical ends 91, 92, and a horizontal partition (valve table) 2 setting apart a comparatively high lower compartment 3 and a shallower upper compartment or "gallery" 4. The lower compartment 3 is in turn sub-divided by a central longitudinal partition 5 (Fig. III) into two equal chambers 6 for the bellows 7 of the meter. Leading from the gas inlet 8 (Fig. II) of the meter, in this instance within the gallery 4, is a channel 9 by which the gas is conducted to a box 10 containing the valves 11 whereby the admission and exhaust of the gas to and from the bellows 7 and the front and rear case compartments 12 and 13 are controlled. The channel 9 may be arranged otherwise than herein shown by way of example without in any way affecting the advantages of my invention, as will be readily understood from further description. Each of the valves 11 comprises a cover 14 which moves back and forth over a seat 15 to alternately connect the outer ports 16 and 17 in the seat with a center port 18. The valve ports 16 communicate respectively through channels as instanced in dotted lines at 19 in Fig. I, with the bellows 7; while the ports 17 communicate respectively with the front and back case compartments 12 and 13. The middle ports in the valve seats 15 lead into the branches 20 of a fork channel 21 by which the gas is conducted to the outlet 22 of the meter.

As ordinarily, the bellows 7 are identical in size, each having an annular diaphragm 23 of highly flexible material such as leather or the like, see Fig. III. One marginal edge of each diaphragm 23 is engaged over a fixed circumferentially-recessed flange ring 25 on the partition 5, and secured gas tight by a cord wrapping 26. The opposite edge margin of each diaphragm 23 is similarly secured, by a cord wrapping 27, to a circumferentially-recessed flange ring 28, which is soldered or otherwise affixed to a metallic disk 29. In turn secured to each diaphragm disk at the center is a flag carriage 30 which is pivotally connected to the swinging end of a flag 31. Suitably journaled in bearings (not shown) at the bottom of casing 1 and extending up through gas tight bearings 32 into the gallery 4 of the meter, are flag rods or shafts 33 to which the flags 31 of the respective bellows 7 are secured. Affixed to the upper ends of the flag rods 33 are flag arms 35, which, through the medium of links 36, are connected to the post or pin 37 of the tangent arm 38 of the meter, the tangent arm being secured after common practice to the valve crank shaft 39. As usual, the pin or post 37 is carried by a sleeve 40 which is adjustable along the threaded portion of the tangent arm 38, and which is fixable in adjusted position by jam nuts 41. At its lower end, the valve crank shaft 39 is journaled in a fixed bearing 42 on the table 2 within the channel 9, and at its upper end in a bearing member 43, commonly known as the "kingpost," soldered to the top wall of said channel. The crank shaft 39 also has journal support where it passes through the top wall of the channel 9, in a gas tight bearing 44. By means of crank arms 45 actuated from the crank shaft 39, the covers 14 of the valves 11 are reciprocated crosswise of the valve seats 15, while confined to straight line movement by attached guide wires 48 which engage guides 49 upstanding on the table 2. Driven by worm gearing 50 from the valve crank shaft 39 is a horizontal axle 51, which, as shown in Fig. II, extends towards the front of the meter and drives the index 52, the latter being separately pictured in Fig. IV.

The refinements which I have made in a gas meter of the type briefly described for attainment of the important practical advantages hereinbefore pointed out are as follows:

Lengthening the stroke of the diaphragm disk 29 increases the volume of gas delivered per revolution of the meter; by which either increased meter capacity for a given size of case, or slower meter operation at a given delivery per hour, or both together, may be secured. However, if the diaphragm stroke is increased in the ordinary design of meter, the diameter of the circle described by the tangent post 37 is increased, and the tangent links 36 are shortened, both these changes tending to increase the angularity between the tangent links and the tangent arm 38, and consequently increasing the irregularity of the meter operation. My invention permits increasing the diaphragm stroke to secure the advantages mentioned, without producing undue angularity between tangent links 36 and tangent arm 38, explained as follows:

In the first place, the flag rods of my invention are positioned, as on axis c—c, Fig. II, appreciably further from the bellows axis b—b than in the ordinary meter; thus lengthening the flag 31, reducing the angle d (flag arm sweep) for a given diaphragm stroke, and reducing in like proportion the diameter of the circle described by the tangent post 37. Obviously the greatest advantage in this respect will be obtained by positioning the flag rods 33 as close to the adjacent end of the casing as possible, of course allowing proper clearance between the casing end and the front flag arm at the outer limit of the motion of the latter.

Here it should be noted that this shift of the flag rods 33 moves the valve crank shaft 39 in the same direction, usually to a position closer to inlet 8 than to outlet 22, in distinction to the ordinary position of valve crank shaft, namely, closer to the outlet. However, it is to be understood that within the scope of my invention, the flag rods 33 may be disposed in positions other than herein shown without sacrifice of the advantages gained; and that the position of the valve crank shaft 39 may be shifted, to agree with such other positions of the flag rods, towards either inlet 8 or outlet 22, as compared to the position shown in Fig. II.

It should be further noted that with valve crank shaft 39 shifted considerably towards inlet 8 as in Fig. II, the ordinary arrangement of valves with their axes at right angles would position the fork channel 20 correspondingly closer to inlet 8, necessitating a deeper compartment 3 to avoid interference between fork channel and diaphragm 23; and necessitating an increase in the length of the fork channel itself, with consequent increased resistance to gas flow. According to my invention, these disadvantages have been obviated by setting the valve axes at an acute angle, and setting the valves 11 close to the outlet 22, as more fully explained below.

It should be further noted that I have disposed the horizontal axle 51 on the outlet side of the valve crank shaft 39 (instead of on the inlet side, as in the ordinary meter) so as to bring the index 52 approximately to the center of the meter, and for a more advantageous arrangement of the leak indicator, as more fully explained hereafter.

In the second place, (returning to consideration of means employed to increase diaphragm stroke without increasing angularity) another departure is made from standard practice in that a transposal is made of the angles $d$ through which flag arms 35 swing. Thus in my improved meter, the front flag arm swings to substantially equal distances to opposite sides of the plane c—c containing the flag rods 33, and the rear flag arm likewise to substantially equal distances relative to a plane e—e parallel with the longitudinal medial plane of the meter; whereas in the usual forms of tin meters, the front and rear flag arms, when at the outer limits of their swings, are parallel respectively with the contiguous side and back walls of the gallery 4. By the change just described, the length of the flag arms 35 is decreased, and the length of the tangent links 36 proportionately increased, to the advantage of reducing the angularity between said links and tangent arm 38, and, by the same token, smoothing the operation of the meter. In order to provide the necessary room for the outward swing of the rear flag arm, a bulge 53 is formed in the back wall of the gallery 4, in the embodiment shown; but this bulge is well within the confines of the lower wider portion of the meter casing and therefore does not add to the overall dimensions of the meter. A further departure from the usual practice is in the disposal of the axes of the valves 11, (as mentioned briefly above) which axes, instead of being arranged at right angles, are spaced by an angle considerably less than ninety degrees, as shown in Fig. II. This is advantageous not only in that it favors greater crosswise compactness of the meter as a whole, but in that it precludes the need of a long fork channel which would otherwise be necessary, in view of the shift of the crank shaft 39 toward the inlet side of the meter, if the usual spacing of the valves had been adhered to. Moreover, with the usual spacing of the valves, the fork channel would interfere with the diaphragm unless the height of the lower chamber of the meter, 3, were increased. The fork channel 21 can be conveniently fashioned to the configuration shown in Fig. XX from a blank of sheet metal such as illustrated in Fig. XXI by bending up the metal along the dash-and-dot lines in the latter illustration. It is to be particularly noted from Fig. XXII that the branches 20 of the fork channel 21 are of trapezium contour in cross section, wider at the bottom than at the top, with attainment of a large cross sectional area of small depth, and provision of greater working clearance for the diaphragms 23. As shown in Fig. I, separate cranks 55 and 56 are provided on the shaft 39 for the crank arms 45, these being spaced by an angle $g$, see Fig. XV, equal to ninety degrees minus the angle between the valve axes, with allowance for crank arm angularity, so that the valve covers 14 move in relation to the diaphragm disks 29 as if the covers were driven from a single crank on valve axes set at right angles as in ordinary meters. As shown in Fig. I, the crank arms rest on bearing collars 89, 90 respectively, which are integral with the valve crank shaft 39. The upper crank 55, and its associated bearing collar 89, are respectively smaller than the lower crank 56 and its associated bearing collar 90, so that the lower crank arm can be slipped down past the upper crank in assembling the meter. A further advantage resulting from the changed spacing of the valves 11 is that crank arms of such length can be provided as to reduce angularity to a proper amount without having to set the valve wrists 57 at the remote edges of said covers, as is sometimes done in ordinary meters. Bulges shown at 58, in the embodiment chosen, provide clearance for the outer ends of the valve guide wires 48. These bulges 58, like the bulges 53 in the back wall, are within the boundaries of the lower wider part of the meter casing.

With the proportionate sizes of valve table 2 and valves 11 shown in Fig. II, these bulges may be dispensed with by moving the valve seats the necessary distance towards the valve crank shaft 39, and shortening the crank arms 45 to correspond. However, the construction shown, including the bulges 58, has the advantages of positioning the fork channel branches 20 closer to the outlet 22 (for clearance in respect to diaphragm 23) and of providing longer crank arms 45, which reduces the angularity between the crank arms and the cranks 55 and 56. A further advantage of these bulges applies particularly to larger sizes of meters. The proportionate sizes of valve table 2 and valves 11 shown in Fig. II are suitable for smaller meters, but when all dimensions are increased in larger meters, relatively larger valves are called for. This is because the valve port area increases as the square of the factor of increase of lineal dimensions, while the volume of gas passed per revolution of the meter increases approximately as the cube of the increase factor, depending on the area of the diaphragm disc and the length of the disc stroke. It is therefore important from the standpoint of capacity to increase the relative sizes of the valves in larger meters, as compared to the valve table size, considerably above the proportions shown in Fig. II; and room for such increase, beyond the limits otherwise existing, is provided by bulges such as 58.

In order to compensate for the angularity between the cranks 55 and 56, and their cooperating crank arms, 45, the outer ports 17 (those leading to the front and rear case compartments 12 and 13) of the valve seats 15 are made smaller, in accordance with my invention, than the inner ports 16 (those leading to the interior of the bellows 7).

This will become clear by comparison of the valve construction of my invention with that of the usual form of meter valve in diagrammatic Figs. XVII and XVIII, drawn with zero lap to simplify the explanation, and by reference to the diagram of Fig. XV. In the succeeding discussion, it will be obvious to those skilled in the art that the usual valve laps may be employed, both in the ordinary valve and in my improved valve, without change of the principles involved. In the ordinary meter valve, the diaphragm port 16' and the case port 17' are made equal in width as shown in Fig. XVII. When the valve cover 14' is in position to seal ports 16' and 17', the crank is displaced from its mid-position (at right angles to valve axis) due to crank arm angularity. This is compensated for by shifting the wrist on the valve guide wire toward the crank arm (or, which amounts to practically the same thing, by lengthening the crank arm) until the center A (Fig. XIX) coincides with the point C, the valve cover being meanwhile left in seal position. The valve will thus be in seal position when the crank is at ninety degrees to the valve axis, but will produce a wipe-over on the crank end of the valve (diaphragm port) and less than full opening on the case port, referring to extreme positions in both instances. Fig. XVII shows a usual valve with equal case and diaphragm ports 17', 16', the valve cover 14' being in seal position, and, for the purpose of simplicity of illustration, drawn with zero lap. This position of seal, in the compensated setting of the ordinary meter, differs from the midstroke position of the valve cover by the distance W, the wipeover. From the position of seal, the valve cover has an extreme travel to the right of R plus W, and to the left of R minus W. At its extreme position away from the crank, the front edge 14w of the valve cover 14' reaches the line N, and the edge 14y reaches the line P, in each case distant from the port edges by the wipe-over W; and at the extreme position toward the crank, the edge 14x reaches the line M, and the edge 14z reaches the line O, again distant from the port edges by W. This shift in valve position is due to compensation for crank arm angularity as above explained. In my arrangement as in Fig. XVIII, the case port 17' of the ordinary meter is reduced in width by the amount of the wipeover, as in 17, leaving the inner edge of port 17 in the same position as the corresponding edge of port 17', and reducing the width of the co-acting portion of the valve cover by the same amount. The diaphragm port 16' is increased by the amount of the wipeover, shifting port edges as shown, and increasing the width of the co-acting portion of the valve cover by the same amount, and shifting said cover portion as shown in Fig. XVIII. Since the positions of the edges of the ports have been changed, as between Fig. XVII and Fig. XVIII, in the same amount and direction as the respectively co-acting valve cover edges, cut-off and admission will take place at the same positions of the valve crank shaft 39 as in the ordinary meter with equal case and diaphragm ports. With the valve constructed according to my invention as in Fig. XVIII, full openings of ports 16 and 17 will be provided respectively at extreme positions of the valve cover 14, cover edge at such extreme positions being directly over corresponding port edge. Valve cover travel from seal position to the right and to the left will be the same as in the ordinary meter with compensated setting, mentioned above. The average extent of opening of the diaphragm and case ports 16 and 17 will be the same as in Fig. XVII, as will be noted by comparison with Fig. XVIII with the aid of the connecting dot-and-dash lines; but the overall length of both cover and seat is reduced by 2W. The minimum opening of the middle port 18 is reduced by W at the end of each stroke; but since the minimum opening of this port, with a width Q nearly equal to 2R as in the ordinary valve, is always greater than the maximum opening of the outer ports from which the middle port exhausts, this reduction of opening of the middle port 18 will not result in any appreciable reduction in valve capacity. The three left hand port-separating bars in Fig. XVIII, it will be noted, have each been reduced in width by W, and the extreme right hand bar increased in width by W, but the effective minimum width of seal at extreme positions of the cover 14 is the same as the minimum seal width in the ordinary meter with compensated setting at the extreme right hand position of the cover 14', that is, the width of the bar in the ordinary meter minus the wipeover. Many different arrangements of the valve may, of course, be made within the scope of my invention, but the one exemplified herein has been adopted because it compares directly with a valve of ordinary construction. If the port widths and crank throw are proportionately increased, to produce a valve with an overall length equal to that of the usual type, then a valve with unequal ports will obviously have greater capacity.

To sum up, replacing ports 16' and 17', of the same width in the ordinary meter, with ports 16 and 17 of different widths, has the following advantages:

(a) A valve seat of equal capacity is provided of shorter overall length;

(b) or of a greater capacity if of equal overall length.

(c) The sum of the widths of the cross bars of the valve seat is reduced, while maintaining the same minimum width of seal at extreme positions of the valve cover as is provided in the ordinary meter with compensated setting at the extreme right hand position of the cover 14', that is, the width of the bar in the ordinary meter minus the wipeover.

(d) The edges of the valve cover are brought directly over the edges of the valve seat at extreme positions of the valve cover, in my invention, thus making for more accurate adjustment in assembly, as compared to the ordinary meter, in which the edges referred to do not coincide at extreme positions.

In the foregoing, (a) and (c) reduce the area of contact between valve cover and valve seat, for a given valve capacity. This reduces the work done by the meter in overcoming resistance between valve cover and valve seat due to the gumminess of gas condensation, thereby increasing meter capacity, and, for a given rate of meter speed, reduces wear on moving parts, thus promoting meter accuracy.

The valve capacity for a given overall length can be still further increased by making the width of the middle port 18 somewhat less than in the usual valve, where it is close to twice the width of the outer ports, 17', 16'. This, in the ordinary meter, would necessitate increasing the depth of the fork channel for maintenance of the requisite cross sectional area, since the fork channel width would decrease with the width of the middle port, and might therefore cause diaphragm interference, which would ordinarily entail an increase in the height of the meter below the valve table 2 for correction. With my improved fork channel 21 having branches 20 of trapezium cross section, the necessary cross sectional area is had without unduly increasing depth.

In order to predetermine more gradual intake and exhaust of the bellows, with avoidance of pressure variations at the meter outlet 22, the transverse edges of the case and diaphragm ports 17, 16 of my improved meter are arranged respectively at a slight angle to the edges of the valve cover 14 co-acting with the port edges to produce admission and cut-off, and to the edges of the middle ports 18 as shown in Fig. II.

The preceding description of my valve with unequal ports is phrased as if the port and cover edges were parallel, and not at a slight angle as in the paragraph immediately foregoing. This was done to simplify the description, and to emphasize the fact that these two features of valve construction are independent of each other. The two features may, however, be combined in one valve, in which case Fig. XVIII would represent conditions only on a line through one end of each of ports 17, 18, 16, and parallel to the direction of movement of the valve cover 14. At the extreme positions of a valve cover combining both these features, full opening of ports 17 and 16 would be provided, and the required effective minimum width of seal; but the valve cover edge would be exactly over the port edge only at the end of the port edge.

The leak indicator herein featured generally resembles the one disclosed in U. S. Patent No. 1,216,412 granted to me on February 20, 1917, in that it comprises a rod 60 (Figs. II and IV) which is pivotally connected at 61 to the front flag arm 35, and which terminates at its other end in a down-turned pointer 62, the latter being confined in the longitudinal slot 63 of a guide plate 64 affixed to the housing of the index 52. In the present instance, however, the indicator pointer 62 has a greater range of movement by reason of the increased length of the rod 60 and corresponding reduction of its angularity, due to the transposal of the flag rods 33 towards the meter inlet 8, and the positioning of the horizontal axle 51 on the outlet side of the valve crank shaft 39, as hereinbefore explained. The movement of the pointer 62 will obviously be more rapid in the central part of the scale 65 over which it travels. Areas 66 of contrasting color, preferably black, have been added at the opposite ends of the scale to remind gas company employees that readings should be taken only on the graduated portion. As shown, one division of the scale is marked by a medial line which may be longer and heavier than the others to indicate the start and stop of leak and proof tests. By reason of moving more quickly and with less lost motion, my improved indicator will disclose a leak more quickly and with greater certainty than the forms of providing head ordinarily employed in meters, and will permit a more accurate test of meter registration when the meter is "proved" with the top in place.

As shown in Figs. I, III, and XVI, the diaphragm disks 29 of my improved meter are stiffened with radial corrugations or undulations 67, which extend from a blank center area 68 to the rim portions of the disks, and which are displaced alternately to opposite sides of the general plane of the disk. As a consequence of this construction, it is possible to produce light yet sturdy disks capable of resisting flexure or deformation, from sheet metal of minimum thickness.

In the bellows 7, the movable flange rings 28 are smaller in diameter than the rings 25, so that they may pass into and out of the fixed flange rings 25 to allow a maximum diaphragm stroke. This movement has a tendency to cause sharp bending of the diaphragms 23 at the regions of juncture with the edges of the disks 29, and results in deterioration of the leather, in the ordinary diaphragm, shortening its useful life. The contingency just mentioned is precluded in accordance with my invention, through provision of backing means in the form of rings 69 (Fig. III) of relatively flexible material such as flesher leather or the like, having a rounded cross section, which rings are secured to the flange rings by a cord wrapping 70. During the operation of the meter, the backing rings 69 will yield and adapt themselves to the movement of the diaphragm while effectively preventing sharp bending of the leather.

The flags 31 of my invention differ from those of the prior art in that each of them is formed with a central longitudinal ridge or rib 71 of "cockscomb" configuration, which has its maximum depth at the fulcrum region of the flag, and which lessens gradually in depth towards the swinging end, thereby approximating the conditions of a cantilever beam of uniform strength. This rib 71, when the flag is attached to the flag rod, extends across the flag rod 33 to the flag rod end of the flag 31, as shown in Fig. I, thus providing the flag with the stiffness and strength lacking in the ordinary design. Since the depth of the rib 71 lessens toward the swinging end of the flag 31, and the rib near its greatest depth moves but little in operation, little or no extra clearance is needed as compared to the ordinary design. Thus here, as in the case of the diaphragm disks, I am able to produce, from metal of minimum thickness, an element, which, although light in weight, is sturdy and rigid and therefore capable of resisting flexure under load, avoiding inaccuracies in meter operation from that cause. The flags, it will be observed, have not been widened at the region of attachment to the flag rods 33 after customary practice. However, if the end trough portions 72 of flags for certain sizes of meters and conditions of service should give insufficient strength of attachment when soldered to the flag rods as usual, said trough portions and the body of the flag adjacent thereto may be lengthened, as desired. As other alternatives, the construction shown in Figs. VII and VIII may be resorted to, in which a small block 73 fitting snugly into the hollow of the rib 71 is secured by a rivet or screw, or the end of the block remote from the flag rod 33 may be reduced in size, passed through a hole in the ridge, and there soldered.

Each flag carriage 30, in accordance with my invention, includes a U-shaped member 74 fashioned from flat strip metal, preferably tinned steel, with beveled edges as in Fig. XIII for ease of soldering it to the plain central portion 68 of the diaphragm disk 29; or it may be fashioned from channel section metal such as shown in Figs. XI and XII. Set into aligned openings in the arms of the U-shaped member 74 are replaceable upper and lower bearing bushings 75, 76 of bronze or the like for the rock shafts 77, said bushings being respectively provided with stop flanges 78, 79 which define their position in the assembly. The upper bearing bushing 75 forms an inverted step bearing for the inverted step bearing at the upper end of the rock shaft 77, while the lower bearing bushing 76 embraces the lower end of the rock shaft 77 as shown. Where white metal is used, the bushings 76, 77 may be cast in place in the members 74. A flag carriage thus constructed will be immune against damage by heat during initial application to the diaphragm disk 29 with solder, or during subsequent removals and replacements in making meter repairs. If the upper arm of the U-member 74 should not be considered strong enough to carry the weight of the diaphragm disks 29, flange ring 28, and diaphragm 23, a tension member which as shown may have the form of a loop 80 of tinned wire (Fig. III), may be forced into place over the member 74 with moderate pressure and soldered fast.

The kingpost or bearing member 43 shown in Figs. I and II and separately illustrated in perspective in Fig. IX is formed, in accordance with my invention, from relatively hard bar metal having the channel cross section shown in Fig. XI, with a replaceable inset bushing of softer metal for the crank shaft. If desired, metal or other cross sections, such as shown in Figs. XII and XIII may be employed for the kingpost. The alternative form of crank bearing member pictured in Fig. XIV and designated 43a, except for being of arched configuration, is otherwise constructed like the one of Fig. IX.

In order to prevent fraudulent procurement of gas by connecting meters in reverse, it has been customary to provide meters with a stop or click to arrest the tangent arm when it revolves in reverse direction. With the usual forms of stops or clicks, trouble was sometimes experienced during idle periods of the meters, through expansion of the gas in the consumer's distribution piping, so that some of such gas was forced back through the meters into supplier's mains. Depending upon the amount of such back flow and the relative positions of the tangent arm and the click when the normal forward flow ceased, the tangent arm may be brought into engagement with the click before the gas pressure is equalized, and thus break or distort some part of the meter. To obviate such contingencies, stop devices such as instanced in U. S. Patents Nos, 1,187,966 and 1,196,653, granted to me respectively on June 20, 1916, and August 29, 1916, were invented, which allow one or two reverse turns of tangent arm before stopping backward motion. The reverse stop of my present invention, generally designated by the numeral 82 in the drawings, permits a greater extent of reverse rotation of the tangent arm before the latter is arrested, the increased amount of reverse rotation being equal approximately to one or two revolutions of the horizontal axle 51 which drives the index 52. As shown in Figs. XXIII–XXVII, my improved reverse stop includes a disk 83 which is loosely held in position between spaced collars 84, 85 fixed on the horizontal axle 51, and which has a peripheral stop projection or tooth 86 normally out of the path of the tangent arm 38. The disk 83 moreover has an irregular cam opening 87 which is approximately heart-shaped, and through which the horizontal axle 51 passes. Also passing through the cam opening 87 of the disk 83 is an eccentrically disposed pin 88, whereof the ends are fixed in peripheral notches of the collars 84, 85.

In the change of the disk 83 from the normal position of Fig. XXIII, through the position of Fig. XXIV, to the position of Fig. XXV, caused by reverse (counter-clockwise) rotation of the horizontal axle 51, the pin 88 by cooperation with the cam opening 87 will cause a tumbling action which will bring the inward lug 83a adjacent to the horizontal axle in the "stop" position shown in Fig. XXV. Thus, with the tangent arm 38 pressing against the stop projection 86 in the elevated position of the latter, the disk 83 will be held firmly in the position relative to the horizontal axle 51 shown in Fig. XXV, and the reverse motion of the meter will be arrested. When normal (clock-wise) revolution of the horizontal axle is resumed, the parts by a reversal of the tumbling action referred to will return to the relation shown in Fig. XXIII for normal operation.

The meter is thus protected on the one hand against damage under back pressure, and against illicit use on the other.

The parts are so proportioned that in normal forward rotation, the center of gravity of the entire reverse stop 82 is on the axis of the horizontal axle 51, or very close thereto. If the center of gravity of the stop 82 in normal operation were appreciably distant from the axis of the horizontal axle 51, the torque thus imposed on the axle, varying over its revolution, would tend to cause irregularities in meter operation.

The parts are also arranged so that, when the reverse motion of the tangent arm 38 is arrested by contact with the stop projection 86, no vertical thrust component is exerted on the tangent arm, such as might permanently distort the tangent arm and affect the accuracy of the meter.

In normal forward operation of the meter, with the parts as in Fig. XXIII, their rotation will be practically noiseless.

While I have herein shown and described my invention in connection with a gas meter of a specific type, certain of the features can obviously be employed with other kinds of meters within the scope of the appended claims.

Having thus described my invention, 1 claim:

1. In a gas meter, a diaphragm; a valve crank shaft; means operatively connecting the diaphragm and the valve crank shaft; a control valve, with a slide cover operated by a crank arm from the crank shaft, and with a seat having a center exhaust port, and outer ports at opposite sides of said center port in communication with opposite sides of the diaphragm, the outer ports being unequal in area in such amount as to compensate for angularity between the crank arm and the crank shaft, and the portions of said slide cover co-acting with said outer ports being correspondingly unequal in area.

2. In a gas meter, a diaphragm; and a valve with a slide cover confined to straight line travel for controlling flow of gas to and from the diaphragm, the seat of said valve having straight sided center and outer ports, and the outer ports being angularly disposed relative to the center port and the edges of the valve cover, so as to determine, by coaction with said cover, gradual admission of the gas to, and its exhaust in like manner from, the diaphragm.

3. In a gas meter, a pair of bellows opposingly arranged; slide valves, with axes of movement arranged in acute angular relation, for controlling flow of gas into and out of the bellows alternately; mechanism deriving movement from the bellows for actuating the valves, including a valve crank shaft to one side of the bellows axis, a tangent arm on the crank shaft, front and rear flag rods further remote from the bellows axis than the crank shaft, and on the same side of said axis as said shaft, front and rear flag arms on the rods connected by links to the tangent arm, the plane of the midstroke position of the front flag arm being substantially coincident with the transverse plane of the rods, and the midstroke position of the rear flag arm being substantially parallel to the longitudinal medial plane of the meter, and crank arms, connecting the crank shaft with the valves, the crank shaft having cranks correspondingly arranged for connection of the crank arms.

4. In a gas meter, a pair of bellows opposingly arranged; slide valves, with axes of movement in acute angular relation, for controlling flow of gas into and out of the bellows alternately; mechanism deriving movement from the bellows for actuating the valves, including a valve crank shaft with plural cranks, said cranks being correspondingly arranged for connection of crank arms connecting the valve crank shaft with the valves, a tangent arm on the shaft, front and rear flag rods, front and rear flag arms on the rods connected by links to the tangent arm, the plane of the midstroke position of the front flag arm being substantially coincident with the transverse plane of the rods, and the midstroke position of the rear flag arm being substantially parallel to the longitudinal medial plane of the meter.

5. A flag for gas meters fashioned from sheet metal with rounded bosses at opposite ends respectively to engage the flag rod and to receive the rock shaft of the flag carriage, with a longitudinal rib which decreases in depth from the flag rod end to the rock shaft end of the flag; a block fitting within the hollow of the rib and apertured for passage of the flag rod through it; and means incorporated with the block for securing the flag to the flag rod.

6. A flag carriage for gas meters, comprising a U shaped bracket component made in one piece, and replaceable cap and open bearings for the rock shaft respectively set into aligned openings in the extremities of the bracket component, with an embracing reinforcing member in the form of a strap connecting the extremities of the bracket component.

7. In a gas meter, a pair of bellows opposingly arranged; slide valves for controlling flow of gas into and out of the bellows; mechanism deriving movement from the bellows for actuating the valves, including a valve crank shaft with plural cranks to one side of the bellows axis, crank arms connecting the cranks with the valves, said cranks being of different diameters to facilitate assembly of the crank arms, a tangent arm on the crank shaft, front and rear flag rods further remote from the bellows axis than the crank shaft, and on the same side of said axis as said shaft, and front and rear flag arms on the rods connected by links to the tangent arm.

8. In a gas meter, a pair of bellows opposingly arranged; slide valves, with axes of motion arranged in acute angular relation, for controlling flow of gas into and out of the bellows; mechanism deriving movement from the bellows for actuating the valves, including a valve crank shaft with plural cranks, and crank arms connecting the cranks with the valves; said cranks being of different diameters to facilitate assembly of said crank arms.

9. In a gas meter, a pair of bellows opposingly arranged; slide valves for controlling flow of gas into and out of the bellows; mechanism deriving movement from the bellows for actuating the valves, including a valve crank shaft with plural cranks to one side of the bellows axis, crank arms connecting the cranks with the valves, said cranks being of different diameters to facilitate assembly of the crank arms, a tangent arm on the valve crank shaft, front and rear flag rods further remote from the bellows axis than the valve crank shaft, and on the same side of said axis as said shaft, and front and rear flag arms on the rods connected by links to the tangent arm, the plane of the midstroke position of the front flag arm being substantially coincident with the transverse plane of the rods, and the midstroke position of the rear flag arm being substantially parallel to the longitudinal medial plane of the meter.

10. A gas meter according to claim 9, in which the axes of motion of the slide valves are arranged in acute angular relation.

11. A gas meter as in claim 3, in which the mechanism deriving movement from the bellows for actuating the valves includes a flag having a longitudinal rib which decreases in depth from the flag rod end of the flag.

12. A gas meter as in claim 7, in which the axes of motion of the slide valves are arranged in acute angular relation.

13. In a gas meter, a pair of bellows opposingly arranged; slide valves for controlling the flow of gas into and out of the bellows; mechanism deriving movement from the bellows for actuating the valves, including a valve crank shaft with plural cranks, crank arms connecting the cranks with the valves, said cranks being of different diameters to facilitate assembly of the crank arms, a tangent arm on the valve crank shaft, front and rear flag rods, and front and rear flag arms on the rods connected by links to the tangent arm, the plane of the midstroke position of the front flag arm being substantially coincident with the transverse plane of the rods, and the midstroke position of the rear flag arm being substantially parallel to the longitudinal medial plane of the meter.

14. A gas meter as in claim 13, in which the axes of motion of the slide valves are arranged in acute angular relation.

15. In a gas meter, a diaphragm; a valve crank shaft; means operatively connecting the diaphragm and the valve crank shaft; a control valve, with a slide cover operated by a crank arm from the valve crank shaft, and with a seat having a center exhaust port, and outer ports at opposite sides of said center port in communication with opposite sides of the diaphragm, the outer ports being unequal in area, and the portions of said slide cover co-acting with said outer ports being correspondingly unequal in area, one outer port being fully opened at one extreme position of the slide cover, and the other outer port being fully opened at the other extreme position of the slide cover.

16. In a gas meter, a substantially rectangular casing; a horizontal partition setting apart an upper chamber and a lower chamber within the casing; a pair of opposingly-arranged coaxial bellows in said lower chamber; slide valves within said upper chamber for controlling gas flow to and from the bellows by way of ports with substantially parallel sides; and a fork channel, made in one piece, for conducting the gas from the exhaust ports of the valves to the outlet of the meter, said fork channel being disposed centrally of the meter to one side of the bellows axis in the interval between the bellows and the horizontal partition, and the branches of the fork channel having trapezium cross sections wider at the bottom than at the top, the cross sectional areas of said branches, and the widths of the bottoms of said branches, increasing continuously from the junctions of the branches with the horizontal partition to the oulet ends of said branches.

17. A flag for gas meters fashioned from sheet metal with rounded bosses at opposite ends respectively to engage the flag rod and to receive the rock shaft, said flag having a longitudinal rib substantially deeper at the flag rod end of the flag than at the rock shaft end, said rib extending across the flag rod when the flag is fixed in place.

18. In a gas meter, a pair of bellows; slide valves for controlling flow of gas into and out of the bellows; mechanism deriving movement from the bellows for actuating the valves, including a valve crank shaft with an upper and a lower crank, each crank having a bearing collar integral with the valve crank shaft; upper and lower crank arms connecting the valve crank shaft with the valves; the upper crank, and its associated bearing collar, being respectively smaller in diameter than the lower crank and its associated bearing collar, so that the lower crank arm can be slipped over the upper crank and upper bearing collar in assembly.

19. In a gas meter, a casing, having an end substantially in a vertical plane; a pair of bellows within said casing; slide valves, with axes of movement arranged in acute angular relation, for controlling flow of gas into and out of the bellows; mechanism deriving movement from the bellows for actuating the valves, including a valve crank shaft, a tangent arm on the valve crank shaft, front and rear flag rods in close proximity to said end, front and rear flag arms on the rods connected by links to the tangent arm, the plane of the midstroke position of the front flag arm being substantially coincident with the transverse plane of the rods, and the midstroke position of the rear flag arm being substantially parallel to the longitudinal medial plane of the meter, and crank arms, connecting the valve crank shaft with the valves, the crank shaft having cranks correspondingly arranged for connection of the crank arms.

20. In a gas meter, a casing, having an end substantially in a vertical plane; a pair of bellows within said casing; slide valves for controlling flow of gas into and out of the bellows; mechanism deriving movement from the bellows for actuating the valves, including a valve crank shaft with plural cranks, crank arms connecting the cranks with the valves, said cranks being of different diameters to facilitate assembly of the crank arms, a tangent arm on the valve crank shaft, front and rear flag rods in close proximity to said end, and front and rear flag arms on the rods connected by links to the tangent arm, the plane of the midstroke position of the front flag arm being substantially coincident with the transverse plane of the rods, and the midstroke position of the rear flag arm being substantially parallel to the longitudinal medial plane of the meter.

21. A gas meter according to claim 20, in which the axes of motion of the slide valves are arranged in acute angular relation.

22. A gas meter as in claim 19, in which the mechanism deriving movement from the bellows for actuating the valves includes a flag having a longitudinal rib substantially deeper at the flag rod end of the flag than at the rock shaft end.

23. In a gas meter, a diaphragm; and a valve with a slide cover confined to straight line travel for controlling the flow of gas to and from the diaphragm, the seat of said valve having straight sided center and outer ports, the transverse edges of each outer port being angularly disposed relative to the respectively co-acting edges of the valve cover, so as to determine gradual admission of the gas to, and its exhaust in like manner from, the diaphragm.

24. In a gas meter, a pair of bellows; slide valves for controlling flow of gas into and out of the bellows; mechanism deriving movement from the bellows for actuating the valves, including a vertical valve crank shaft, integrally formed, with an upper crank and a lower crank, and crank arms respectively connecting the cranks with the valves; the upper crank being smaller in diameter than the lower crank so that the lower crank arm can be slipped over the upper crank in assembling.

25. In a gas meter, a casing, having an end substantially in a vertical plane; a pair of bellows within said casing; slide valves for controlling flow of gas into and out of the bellows; mechanism deriving movement from the bellows for actuating the valves, including a vertical valve crank shaft, integrally formed, with an upper crank and a lower crank, crank arms respectively connecting the cranks with the valves, the upper crank being smaller in diameter than the lower crank so that the lower crank arm can be slipped over the upper crank in assembling, a tangent arm on the valve crank shaft, front and rear flag rods in close proximity to said end, and front and rear flag arms on the rods connected by links to the tangent arm.

26. In a gas meter, a casing, having an end substantially in a vertical plane; a pair of bellows within said casing; slide valves, with axes of motion arranged in acute angular relation, for controlling flow of gas into and out of the bellows; mechanism deriving movement from the bellows for actuating the valves, including a valve crank shaft with plural cranks, crank arms connecting the cranks with the valves, said cranks being of different diameters to facilitate assembly of the crank arms, a tangent arm on the valve crank shaft, front and rear flag rods in close proximity to said end, and front and rear flag arms on the rods connected by links to the tangent arm.

27. In a gas meter, a casing, having an end substantially in a vertical plane; a pair of bellows within said casing; slide valves for controlling flow of gas into and out of the bellows; mechanism deriving movement from the bellows for actuating the valves, including a valve crank shaft with plural cranks, crank arms connecting the cranks with the valves, said cranks being of different diameters to facilitate assembly of the crank arms, a tangent arm on the valve crank shaft, front and rear flag rods in close proximity to said end, front and rear flag arms on the rods connected by links to the tangent arm, and flags on the rods having longitudinal ribs substantially deeper at the flag rod ends of the flags than at their other ends.

WILLIAM LAIRD BROWN.